(12) United States Patent
Bailey et al.

(10) Patent No.: US 12,296,572 B2
(45) Date of Patent: *May 13, 2025

(54) SOUND DAMPING GYPSUM BOARD AND METHOD OF CONSTRUCTING A SOUND DAMPING GYPSUM BOARD

(71) Applicant: Gold Bond Building Products, LLC, Charlotte, NC (US)

(72) Inventors: Joseph J. Bailey, Charlotte, NC (US); Richard Weir, Indian Trail, NC (US); R. G. Iyer, Charlotte, NC (US); Eli Stav, Charlotte, NC (US); Bradley J. Busche, Shelby, NC (US)

(73) Assignee: Gold Bond Building Products, LLC, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/452,645

(22) Filed: Aug. 21, 2023

(65) Prior Publication Data

US 2023/0391064 A1    Dec. 7, 2023

Related U.S. Application Data

(63) Continuation of application No. 17/338,880, filed on Jun. 4, 2021, now Pat. No. 11,772,372.

(60) Provisional application No. 63/035,203, filed on Jun. 5, 2020.

(51) Int. Cl.
| | |
|---|---|
| *B32B 37/15* | (2006.01) |
| *B32B 7/12* | (2006.01) |
| *B32B 9/00* | (2006.01) |
| *G10K 11/168* | (2006.01) |

(52) U.S. Cl.
CPC ............... *B32B 37/15* (2013.01); *B32B 7/12* (2013.01); *B32B 9/005* (2013.01); *G10K 11/168* (2013.01); *B32B 2255/26* (2013.01); *B32B 2307/102* (2013.01); *B32B 2419/00* (2013.01)

(58) Field of Classification Search
CPC .......... B32B 37/15; B32B 7/12; B32B 9/005; B32B 2255/26; B32B 2307/102; B32B 2419/00; G10K 11/168
See application file for complete search history.

(56) References Cited

U.S. PATENT DOCUMENTS

| | | |
|---|---|---|
| 1,769,519 A | 7/1930 | King et al. |
| 1,996,032 A | 3/1935 | Roos |
| 1,996,033 A | 3/1935 | King |
| 2,045,311 A | 6/1936 | Roos et al. |
| 2,045,312 A | 6/1936 | Roos et al. |
| 3,087,567 A | 4/1963 | Guenther |
| 3,215,225 A | 11/1965 | Francies |
| 3,350,257 A | 10/1967 | Hourigan et al. |
| 3,424,270 A | 1/1969 | Hartman et al. |
| 3,489,242 A | 1/1970 | Gladding et al. |
| 3,511,741 A | 5/1970 | Elder |
| 3,562,092 A | 2/1971 | Oberst et al. |
| 3,652,360 A | 3/1972 | Hartman et al. |
| 3,674,624 A | 7/1972 | Oberst et al. |
| 4,663,224 A | 5/1987 | Tabata et al. |
| 4,964,243 A | 10/1990 | Reiter |
| 5,063,098 A | 11/1991 | Niwa et al. |
| 5,103,614 A | 4/1992 | Kawaguchi et al. |
| 5,125,475 A | 6/1992 | Ducharme et al. |
| 5,198,052 A | 3/1993 | Ali |
| 5,258,585 A | 11/1993 | Juriga |
| 5,411,810 A | 5/1995 | Hirakouchi et al. |
| 5,438,806 A | 8/1995 | Reinhall |
| 5,477,652 A | 12/1995 | Torrey et al. |
| 5,502,931 A | 4/1996 | Munir |
| 5,543,193 A | 8/1996 | Tesch |
| 5,584,950 A | 12/1996 | Gaffigan |
| 5,604,025 A | 2/1997 | Tesch |
| 5,691,037 A | 11/1997 | Mccutcheon et al. |
| 5,907,932 A | 6/1999 | LeConte et al. |
| 5,975,238 A | 11/1999 | Fuchs et al. |
| 6,048,426 A | 4/2000 | Pratt |
| 6,077,613 A | 6/2000 | Gaffigan |
| 6,145,617 A | 11/2000 | Alts |
| 6,202,462 B1 | 3/2001 | Hansen et al. |

(Continued)

FOREIGN PATENT DOCUMENTS

| | | |
|---|---|---|
| GB | 1489825 | 10/1977 |
| GB | 2499063 | 8/2013 |

(Continued)

OTHER PUBLICATIONS

CSTB, Document Technique d'Application: Knauf BA25—BA18/900, Jul. 18, 2010 (www.ctsb.fr/pdf/atec/GS09-JAJ090884_V1.pdf).

(Continued)

*Primary Examiner* — Vishal I Patel
(74) *Attorney, Agent, or Firm* — Dority & Manning, P.A.

(57) ABSTRACT

The present invention is directed to an improved gypsum board, such as an improved sound damping gypsum board, and a method of making such gypsum board. For instance, the method comprises: providing a first encasing layer and a first sound damping layer on the first encasing layer wherein the sound damping layer includes at least 50 wt. % of a first sound damping polymer; depositing a gypsum slurry comprising stucco and water on the sound damping layer to form a gypsum core; providing a second encasing layer on the gypsum slurry; and allowing the stucco to convert to calcium sulfate dihydrate.

19 Claims, No Drawings

(56) References Cited

U.S. PATENT DOCUMENTS

| | | |
|---|---|---|
| 6,287,664 B1 | 9/2001 | Pratt |
| 6,309,985 B1 | 10/2001 | Virnelson et al. |
| 6,334,280 B1 | 1/2002 | Frappart et al. |
| 6,467,521 B1 | 10/2002 | Pratt |
| 6,640,507 B1 | 11/2003 | Leconte |
| 6,739,532 B2 | 5/2004 | McCamley |
| 6,808,793 B2 | 10/2004 | Randall et al. |
| 6,828,020 B2 | 12/2004 | Fisher et al. |
| 6,901,713 B2 | 6/2005 | Axsom et al. |
| 6,998,359 B2 * | 2/2006 | Bingenheimer ......... B32B 5/18 156/39 |
| 7,056,582 B2 | 6/2006 | Carbo et al. |
| 7,181,891 B2 | 2/2007 | Surace et al. |
| 7,344,772 B2 | 3/2008 | Rehfeld et al. |
| 7,603,824 B1 | 10/2009 | Hartanto |
| 7,705,101 B2 | 4/2010 | Sherman et al. |
| 7,745,005 B2 | 6/2010 | Tinianov |
| 7,798,287 B1 * | 9/2010 | Surace ................. E04B 9/0435 181/290 |
| 7,799,410 B2 | 9/2010 | Tinianov |
| 7,833,916 B2 | 11/2010 | Leeser et al. |
| 7,883,763 B2 | 2/2011 | Tinianov |
| 7,908,818 B2 | 3/2011 | Tinianov et al. |
| 7,909,136 B2 | 3/2011 | Surace et al. |
| 7,921,965 B1 * | 4/2011 | Surace ................... E04B 9/045 181/290 |
| 7,973,106 B2 | 7/2011 | Fisk et al. |
| 7,987,645 B2 | 8/2011 | Tinianov |
| 8,028,800 B2 | 10/2011 | Ravnaas |
| 8,029,881 B2 | 10/2011 | Surace et al. |
| 8,057,915 B2 | 11/2011 | Song et al. |
| 8,181,417 B2 | 5/2012 | Surace et al. |
| 8,181,738 B2 | 5/2012 | Tinianov et al. |
| 8,397,864 B2 | 3/2013 | Tinianov et al. |
| 8,424,251 B1 | 4/2013 | Tinianov |
| 8,448,389 B2 | 5/2013 | Doneux et al. |
| 8,495,851 B2 | 7/2013 | Surace et al. |
| 8,534,419 B2 | 9/2013 | Coates et al. |
| 8,590,272 B2 | 11/2013 | Thomas et al. |
| 8,590,670 B1 | 11/2013 | Grube et al. |
| 8,684,134 B2 | 4/2014 | Dugan et al. |
| 8,770,345 B2 | 7/2014 | Dugan et al. |
| 8,900,691 B2 | 12/2014 | Rehfeld et al. |
| 8,925,677 B2 | 1/2015 | Dugan et al. |
| 8,926,855 B2 | 1/2015 | Thomas et al. |
| 8,950,549 B2 | 2/2015 | Coates et al. |
| 9,033,102 B2 | 5/2015 | Payot et al. |
| 9,045,898 B2 | 6/2015 | Ravnaas |
| 9,051,731 B2 | 6/2015 | Thomas et al. |
| 9,085,894 B2 | 7/2015 | Eckman et al. |
| 9,102,122 B2 | 8/2015 | Rehfeld et al. |
| 9,157,242 B2 | 10/2015 | Thomas et al. |
| 9,200,438 B2 | 12/2015 | Blanchard et al. |
| 9,334,662 B2 | 5/2016 | Spanton et al. |
| 9,387,649 B2 | 7/2016 | Tinianov et al. |
| 9,388,568 B2 | 7/2016 | Tinianov |
| 9,446,458 B2 | 9/2016 | Huchet |
| 9,487,952 B2 | 11/2016 | Nilsson et al. |
| 9,499,975 B2 | 11/2016 | Thomas et al. |
| 9,512,613 B2 | 12/2016 | Blades et al. |
| 9,561,601 B2 | 2/2017 | Santamaria et al. |
| 9,580,901 B2 | 2/2017 | Payot et al. |
| 9,623,627 B2 | 4/2017 | Coates et al. |
| 9,637,913 B2 | 5/2017 | Ravnaas |
| 9,733,173 B2 | 8/2017 | Rehfeld et al. |
| 9,890,530 B2 | 2/2018 | Tierney et al. |
| 9,903,116 B2 | 2/2018 | Ray |
| 9,909,304 B2 * | 3/2018 | Blades ................... B32B 37/12 |
| 9,945,119 B2 | 4/2018 | Aldabaibeh et al. |
| 10,174,499 B1 | 1/2019 | Tinianov |
| 11,559,968 B2 * | 1/2023 | Bailey .................... B32B 13/12 |
| 2002/0028332 A1 | 3/2002 | Pratt |
| 2003/0070367 A1 | 4/2003 | Gelin et al. |
| 2003/0077443 A1 | 4/2003 | Di Stefano et al. |
| 2003/0141144 A1 | 7/2003 | Wilson |
| 2004/0026002 A1 | 2/2004 | Weldon et al. |
| 2004/0048022 A1 | 3/2004 | Pratt |
| 2004/0219322 A1 | 11/2004 | Fisher et al. |
| 2005/0080193 A1 | 4/2005 | Wouters et al. |
| 2005/0153613 A1 | 7/2005 | Bingenheimer |
| 2005/0196608 A1 | 9/2005 | Wouters et al. |
| 2005/0211500 A1 | 9/2005 | Wendt et al. |
| 2005/0255318 A1 | 11/2005 | Czerny |
| 2006/0182978 A1 | 8/2006 | Leroy et al. |
| 2007/0102237 A1 | 5/2007 | Baig |
| 2007/0137139 A1 | 6/2007 | Tierney et al. |
| 2007/0175173 A1 | 8/2007 | Babineau, Jr. et al. |
| 2008/0171179 A1 | 7/2008 | Surace et al. |
| 2008/0178544 A1 | 7/2008 | Clark et al. |
| 2008/0264721 A1 | 10/2008 | Tinianov et al. |
| 2009/0000245 A1 | 1/2009 | Tinianov |
| 2009/0000866 A1 * | 1/2009 | Tinianov ................ E04B 1/86 181/290 |
| 2009/0107059 A1 | 4/2009 | Kipp et al. |
| 2009/0239429 A1 | 9/2009 | Kipp et al. |
| 2010/0018799 A1 | 1/2010 | Boyadjian et al. |
| 2010/0038169 A1 | 2/2010 | Lee |
| 2010/0066121 A1 | 3/2010 | Gross |
| 2010/0126800 A1 | 5/2010 | Albin, Jr. |
| 2010/0180916 A1 | 7/2010 | Colon et al. |
| 2010/0230206 A1 * | 9/2010 | Tinianov ................ B32B 3/00 181/290 |
| 2010/0273382 A1 | 10/2010 | Nandi et al. |
| 2011/0076470 A1 | 1/2011 | Belady et al. |
| 2011/0064916 A1 | 3/2011 | Sherman et al. |
| 2011/0252739 A1 | 10/2011 | Leeser et al. |
| 2012/0058289 A1 | 3/2012 | Coates et al. |
| 2012/0073899 A1 | 3/2012 | Fournier et al. |
| 2013/0087409 A1 | 4/2013 | Payot et al. |
| 2013/0240111 A1 | 9/2013 | Tinianov |
| 2013/0240291 A1 | 9/2013 | Tinianov |
| 2013/0316158 A1 | 11/2013 | Rehfeld et al. |
| 2014/0273687 A1 | 9/2014 | Garvey et al. |
| 2015/0322670 A1 | 11/2015 | Hotchin et al. |
| 2016/0230395 A1 | 8/2016 | Cusa et al. |
| 2017/0015085 A1 | 1/2017 | Chuda et al. |
| 2017/0165945 A1 | 6/2017 | Payen et al. |
| 2017/0210097 A1 | 7/2017 | Payen et al. |
| 2017/0225426 A1 | 8/2017 | Glean et al. |
| 2018/0171626 A1 | 6/2018 | Shi et al. |
| 2018/0320369 A1 | 11/2018 | Garvey et al. |
| 2018/0330709 A1 | 11/2018 | McGrail et al. |
| 2019/0017261 A1 | 1/2019 | Chuda et al. |
| 2019/0030860 A1 | 1/2019 | Chuda et al. |
| 2019/0071867 A1 | 3/2019 | Tinianov |
| 2019/0093343 A1 | 3/2019 | Dimitrakopoulos et al. |
| 2019/0093354 A1 | 3/2019 | Dimitrakopoulos et al. |
| 2020/0131759 A1 | 4/2020 | Blades et al. |
| 2020/0247091 A1 | 8/2020 | Glean et al. |

FOREIGN PATENT DOCUMENTS

| | | |
|---|---|---|
| JP | S5444971 | 12/1979 |
| JP | 2004042557 | 2/2004 |

OTHER PUBLICATIONS

Product Info on QuietGlue QG-311 from Quiet Solution, 2005, 2 pages.

* cited by examiner

SOUND DAMPING GYPSUM BOARD AND METHOD OF CONSTRUCTING A SOUND DAMPING GYPSUM BOARD

CROSS-REFERENCE TO RELATED APPLICATION

The present application is a continuation of U.S. patent application Ser. No. 17/338,880 having a filing date of Jun. 4, 2021 which claims filing benefit of U.S. Provisional Patent Application Ser. No. 63/035,203 having a filing date of Jun. 5, 2020, both of which are incorporated herein by reference in their entirety.

BACKGROUND

A building is typically constructed with walls having a frame comprising vertically oriented studs connected by horizontally oriented top and bottom plates or tracks. The walls often include one or more gypsum boards fastened to the studs and/or plates on each side of the frame or, particularly for exterior walls, one or more gypsum boards fastened to the studs and/or plates on one side of the frame with a non-gypsum based sheathing attached to an exterior side of the frame. A ceiling of the building may also include one or more gypsum boards oriented horizontally and fastened to joists, studs, or other structural members extending horizontally in the building. Walls and ceilings of this construction often have poor acoustical performance and a low sound transmission class (STC) rating, which results in noise pollution, lack of privacy, and similar issues in the various spaces of the building. One of the aspects of this poor performance is the coincidence between the human voice Hertz spectrum and the vibrational Hertz range of standard gypsum board, which creates a unique dip in the acoustical curve of a standard frame and gypsum board wall.

While boards currently exist that provide sound damping, there is still a need to further improve the acoustical performance of the boards and provide improved sound damping.

SUMMARY OF THE INVENTION

In accordance with one embodiment of the present invention, a method of forming a gypsum board is disclosed. The method comprises: providing a first encasing layer and a first sound damping layer on the first encasing layer wherein the sound damping layer includes at least 50 wt. % of a first sound damping polymer; depositing a gypsum slurry comprising stucco and water on the sound damping layer to form a gypsum core; providing a second encasing layer on the gypsum slurry; and allowing the stucco to convert to calcium sulfate dihydrate.

In accordance with another embodiment of the present invention, a gypsum board is disclosed. The gypsum board is formed by the following method: providing a first encasing layer and a first sound damping layer on the first encasing layer wherein the sound damping layer includes at least 50 wt. % of a first sound damping polymer; depositing a gypsum slurry comprising stucco and water on the sound damping layer to form a gypsum core; providing a second encasing layer on the gypsum slurry; and allowing the stucco to convert to calcium sulfate dihydrate.

DETAILED DESCRIPTION

Reference now will be made in detail to embodiments, one or more examples of which may be illustrated in any drawings. Each example is provided by way of explanation of the embodiments, not as a limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally speaking, the present invention is directed to a gypsum board, such as an improved sound damping gypsum board, and a method of making such gypsum board. In particular, the present invention is directed to the application of a sound damping polymer on an encasing layer prior to deposition of a gypsum slurry for producing the gypsum core. In this regard, the sound damping polymer may be present between the encasing layer and the gypsum core. The present inventors have discovered that various benefits may also be realized. For instance, improvements in the acoustical performance of the gypsum board may be realized by the minimization of sound transmission through a wall containing such gypsum boards. In addition, such application of the sound damping polymer may also assist with simplifying the manufacturing process in comparison to certain conventional techniques.

For instance, in comparison to conventional gypsum board, in particular an existing, installed gypsum board without a sound damping layer, the sound damping gypsum board as disclosed herein would exhibit a sound transmission loss of 5% or more, such as 10% or more, such as 15% or more, such as 20% or more, such as 25% or more, such as 30% or more, such as 35% or more, such as 40% or more, such as 45% or more, such as 50% or more and less than 100%, such as less than 90%, such as less than 80%, such as 70% or less, such as 60% or less in comparison to the conventional gypsum board without a sound damping layer. Such comparison may be at any frequency and in particular at a frequency of 100 Hz or more, such as 125 Hz or more, such as 500 Hz or more, such as 1000 Hz or more, such as 2000 Hz or more, such as 2500 Hz or more, such as 3150 Hz or more, such as 4000 Hz or more. In particular, such comparison may be at 100 Hz, such as 125 Hz, such as at 500 Hz, such as at 1000 Hz, such as at 2000 Hz, such as at 2500 Hz, such as at 3150 Hz, such as at 4000 Hz. In addition, such comparison may be at any 2, such as at any 3, such as at any 4, such as at any 5 of the aforementioned frequencies.

Further, the sound transmission loss for a wall assembly including the sound damping gypsum board as disclosed herein may be 1% or more, such as 2% or more, such as 5% or more, such as 10% or more, such as 15% or more, such as 20% or more, such as 30% or more than the sound transmission loss for a wall assembly not including a sound damping layer as disclosed herein. Such comparison may be at any frequency and in particular at a frequency of 500 Hz or more, such as 1000 Hz or more, such as 2000 Hz or more, such as 2500 Hz or more, such as 4000 Hz or more. In particular, such comparison may be at 500 Hz, such as at 1000 Hz, such as at 2000 Hz, such as at 2500 Hz, such as at 4000 Hz. In addition, such comparison may be at any 2, such as at any 3, such as at any 4, such as at any 5 of the aforementioned frequencies.

In addition, at a frequency of 1000 Hz, the sound transmission loss of the sound damping gypsum board as disclosed herein may be 40 dB or more, such as 45 dB or more, such as 50 dB or more, such as 55 dB or more, such as 56 dB or more, such as 57 dB or more, such as 58 dB or more, such as 60 dB or more. At a frequency of 2000 Hz, the sound transmission loss of the sound damping gypsum board as disclosed herein may be more than 40 dB, such as 45 dB or more, such as 50 dB or more, such as 51 dB or more, such as 52 dB or more, such as 53 dB or more, such as 55 dB or more, such as 57 dB or more. At a frequency of 4000 Hz, the sound transmission loss of the sound damping gypsum board as disclosed herein may be more than 40 dB, such as 45 dB or more, such as 50 dB or more, such as 52 dB or more, such as 53 dB or more, such as 55 dB or more, such as 57 dB or more, such as 59 dB or more, such as 60 dB or more.

In general, the present invention is directed to a sound damping gypsum board and a method of making such gypsum board. For instance, in the method of making a sound damping gypsum board, a first encasing layer may be provided wherein the first encasing layer has a first encasing layer surface and a second encasing layer surface opposite the first encasing layer surface. The first encasing layer may be conveyed on a conveyor system (i.e., a continuous system for continuous manufacture of gypsum board). In addition, a sound damping polymer as disclosed herein may be provided on the first encasing layer surface. For instance, the sound damping polymer may be provided on the first encasing layer surface offline such that it is already provided on the first encasing layer prior to use in the manufacture of the gypsum board. Alternatively, or in addition, the sound damping polymer may be provided inline during the manufacture of the gypsum board. In this regard, in one embodiment, the sound damping polymer may already be set on the encasing layer prior to deposition of the gypsum slurry. In another embodiment, the sound damping polymer may not already be set on the encasing layer prior to deposition of the gypsum slurry.

When providing the sound damping polymer, it may be applied using means known in the art, such as roll coating, spraying, etc. The sound damping polymer may be applied to form a continuous layer, to form a pattern, or in a random manner. For example, the pattern may be a grid pattern. In addition, it should be understood that the pattern may be a regular pattern or an irregular pattern. Furthermore, by forming a pattern or applying the sound damping polymer in a random manner, such application may result in a discontinuous sound damping layer. Also, when providing the sound damping polymer, it may be utilized according to the disclosure provided above or below to achieve the desired sound damping properties.

The sound damping polymer may be any polymer that can provide an improved acoustical performance or sound damping effect. For instance, the sound damping polymer may comprise a thermoplastic polymer or a thermoset polymer. In one embodiment, the sound damping polymer comprises a thermoplastic polymer. In another embodiment, the sound damping polymer comprises a thermoset polymer. In one particular embodiment, the sound damping polymer may be an elastomer, in particular a thermoplastic elastomer.

Suitable sound damping polymers include, as non-limiting examples, synthetic resins, polymers and copolymers, and latex polymers as are known in the art. In a preferred embodiment, the sound damping polymer is an acrylic (or acrylate) polymer or copolymer. One such non-limiting example is Acronal®, an acrylate copolymer commercially available from BASF (Charlotte, NC). Another non-limiting example is QuietGlue™, which includes an acrylic (or acrylate) polymer and in particular two of such polymers. The formulation for QuietGlue™ can be found in U.S. Pat. No. 7,921,965, which is incorporated herein by reference in its entirety. Other examples of polymers may include, but are not limited to, styrene acrylics, acrylic esters, vinyl acrylics, vinyl chloride acrylics, styrene acetate acrylics, ethylene polyvinyl acetate, polyvinyl acetate, styrene butadiene, etc. When provided in a formulation, the concentration of the sound damping polymer may not necessarily be limited. However, such formulation should have sufficient fluidity (e.g., with the presence of water) to allow for the formulation and polymer to be handled and processed for incorporation into the gypsum slurry. Alternatively, because the sound damping polymer may be applied at an interface, it should also have sufficient fluidity for application at an interface of an encasing layer and the gypsum slurry.

In addition, it should be understood that the sound damping polymer may include more than one different sound damping polymers. For instance, in one embodiment, at least two sound damping polymers may be provided onto the first encasing layer.

In one or more embodiments, the sound damping material comprises a polymer having a dynamic glass transition temperature at or below the working temperature at which the sound damping layer will be used. For instance, the working temperature may be the temperature at which the sound damping polymer will be utilized. In this regard, in one embodiment, the sound damping polymer may be provided as a glue, such as a viscoelastic glue. Such glue may be provided onto the encasing layer for forming a sound damping layer.

In addition, the sound damping polymer may have a relatively low glass transition temperature. For instance, the polymer may have a glass transition temperature of room temperature or less. For instance, the polymer may have a glass transition temperature of 25° C. or less, such as 20° C. or less, such as 10° C. or less, such as 5° C. or less, such as 1° C. or less, such as 0° C. or less, such as −5° C. or less, such as −10° C. or less, such as −15° C. or less, such as −20° C. or less, such as −25° C. or less, such as −30° C. or less, such as −35° C. or less, such as −40° C. or less, such as −50° C. or less. The polymer may have a glass transition temperature of −90° C. or more, such as −80° C. or more, such as −75° C. or more, such as −70° C. or more, such as −65° C. or more, such as −60° C. or more, such as −55° C. or more, such as −50° C. or more, such as −40° C. or more, such as −30° C. or more.

The sound damping polymer may be present in an amount of 0.001 lbs/MSF or more, such as 0.01 lbs/MSF or more, such as 0.05 lbs/MSF or more, such as 0.1 lbs/MSF or more, such as 0.2 lbs/MSF or more, such as 0.25 lbs/MSF or more, such as 0.5 lbs/MSF or more, such as 0.75 lbs/MSF or more, such as 1 lb/MSF or more, such as 1.5 lbs/MSF or more, such as 2 lbs/MSF or more, such as 2.5 lbs/MSF or more, such as 3 lbs/MSF or more, such as 4 lbs/MSF or more. The sound damping polymer may be present in an amount of 150 lbs/MSF or less, such as 100 lbs/MSF or less, such as 50 lbs/MSF or less, such as 25 lbs/MSF or less, such as 15 lbs/MSF or less, such as 10 lbs/MSF or less, such as 5 lbs/MSF or less, such as 4 lbs/MSF or less, such as 3 lbs/MSF or less, such as 2.5 lbs/MSF or less, such as 2 lbs/MSF or less, such as 1.5 lbs/MSF or less, such as 1 lbs/MSF or less. Such MSF value may be the weight of the gypsum board in one embodiment. In another embodiment, such MSF value may be the weight of the gypsum within the gypsum core.

The sound damping polymer may be provided as a formulation that may also comprise various additives, including anti-microbial materials for fungal protection and appropriate fillers such as, in non-limiting examples, vermiculite, expanded mica, perlite, talc, lead, and granulated polystyrene aluminum oxide. Additional embodiments include a tacky adhesive constructed of one or more polymers having fluidity at an ordinary temperature and one or more emulsion type or solvent type polymers consisting of one or more natural rubbers, synthetic rubbers, and polymers such as, in non-limiting examples, acrylic resin and silicone resin. A tackifier, including such non-limiting examples as petroleum resin and sap, a softener, and/or a plasticizer are included in the sound damping layer in one or more embodiments of the present disclosure. Other non-limiting examples of additives used to form the sound damping material include polyester resins, resins constructed from plasticizers or peroxide being added to polyester, multiple polyesters, polyurethane foam, polyamide resin, ethylene-vinyl acetate copolymers, ethylene acrylic acid copolymers, polyurethane copolymers, and EPDM polymers. In addition, other additives may include one or more additives that are conventionally used within the gypsum core (e.g., calcium sulfate hemihydrate, calcium sulfate dihydrate, natural polymers such as starches, phosphates, and the like). In one embodiment, such additives may include cellulosic materials such as cellulose fibers, microcellulose, nanocellulose, and the like. The additives may include coated and uncoated inorganic materials (e.g., porous siliceous materials, minerals, and the like). The additives may include plated or hollow materials such as mica, graphite, micro-glass flakes, glass micro- or nanobubbles, or mixtures thereof. The additives may include density altering materials such as barium sulfate, fly ash, calcium carbonate, magnesium carbonate, rubber (e.g., ground or cut rubber), cork, mixtures thereof, and the like. In addition, the sound damping layer may include a pigment. Also, as indicated above, the sound damping layer may include an inorganic particle. The additives may include porous natural materials such as wood chips, saw dust, rice husks, other fibrous materials, etc., and mixtures thereof. The additives may include those that alter the fluidity such as surfactants, dispersants, thickening agents, and/or fluidizing agents (e.g., glycerin, ethoxylated glycerin, etc.). The additives may include those that alter the rate and degree of curing and adhesion such as tackifiers.

The formulation including the sound damping polymer may also have a certain viscosity. For instance, the viscosity may be 500 cps or greater, such as 1000 cps or greater, such as 2000 cps or greater, such as 3000 cps or greater, such as 4000 cps or greater, such as 5000 cps or greater, such as 6000 cps or greater, such as 7000 cps or greater. The viscosity may be 15000 cps or less, such as 13000 cps or less, such as 11000 cps or less, such as 10000 cps or less, such as 9000 cps or less, such as 8000 cps or less, such as 7000 cps or less, such as 6000 cps or less, such as 5000 cps or less, such as 4000 cps or less, such as 3000 cps or less, such as 2000 cps or less, such as 1500 cps or less, such as 1000 cps or less. The viscosity may be determined using a Brookfield viscometer with a #4 spindle, a speed of 30 rpm, and 500 mL of formulation.

In one embodiment, the sound damping layer may include at least one of gypsum, calcium carbonate, magnesium carbonate, pigment, polyurea, or an inorganic particle. For instance, the sound damping layer may include at least gypsum. In another embodiment, the sound damping layer may include at least calcium carbonate. In a further embodiment, the sound damping layer may include at least magnesium carbonate. In another further embodiment, the sound damping layer may include at least one pigment. In an even further embodiment, the sound damping layer may include polyurea. In another embodiment, the sound damping layer may include an inorganic particle. In addition, it should be understood that the sound damping layer may include any two of the aforementioned in combination. Further, the sound damping layer may include any three of the aforementioned in combination.

The sound damping polymer may also be provided with or used in conjunction with materials or additives that may provide different sound damping effects and performance. For instance, with respect to such additives, one may have a higher density than the other additive. These additives may include, but are not limited to, microspheres (e.g., hollow microspheres, filled microspheres), glass spheres, cenospheres, waste materials, minerals (e.g., high density, low density), metals, etc.

Regardless of the above, these additives may be utilized in amounts to obtain the desired properties. For instance, these additives, alone or in combination, may be present in an amount of 0.001 lbs/MSF or more, such as 0.01 lbs/MSF or more, such as 0.05 lbs/MSF or more, such as 0.1 lbs/MSF or more, such as 0.2 lbs/MSF or more, such as 0.25 lbs/MSF or more, such as 0.5 lbs/MSF or more, such as 0.75 lbs/MSF or more, such as 1 lb/MSF or more, such as 1.5 lbs/MSF or more, such as 2 lbs/MSF or more, such as 2.5 lbs/MSF or more, such as 3 lbs/MSF or more, such as 4 lbs/MSF or more. These additives, alone or in combination, may be present in an amount of 150 lbs/MSF or less, such as 100 lbs/MSF or less, such as 50 lbs/MSF or less, such as 25 lbs/MSF or less, such as 15 lbs/MSF or less, such as 10 lbs/MSF or less, such as 5 lbs/MSF or less, such as 4 lbs/MSF or less, such as 3 lbs/MSF or less, such as 2.5 lbs/MSF or less, such as 2 lbs/MSF or less, such as 1.5 lbs/MSF or less, such as 1 lbs/MSF or less. Such MSF value may be the weight of the gypsum board in one embodiment. In another embodiment, such MSF value may be the weight of the gypsum within the gypsum core.

As indicated above, the sound damping layer includes the sound damping polymer and may include other additives. Regardless, the sound damping layer may include the sound damping polymer in an amount of 50 wt. % or more, such as 60 wt. % or more, such as 70 wt. % or more, such as 75 wt. % or more, such as 80 wt. % or more, such as 85 wt. % or more, such as 90 wt. % or more, such as 95 wt. % or more. The sound damping polymer may be present in an amount of 100 wt. % or less, such as 99.5 wt. % or less, such as 99 wt. % or less, such as 98.5 wt. % or less, such as 98 wt. % or less, such as 97.5 wt. % or less, such as 95 wt. % or less, such as 93 wt. % or less, such as 90 wt. % or less. In this regard, the sound damping layer may include any of the aforementioned additives, alone or in combination, in an amount of 50 wt. % or less, such as 40 wt. % or less, such as 30 wt. % or less, such as 25 wt. % or less, such as 20 wt. % or less, such as 15 wt. % or less, such as 10 wt. % or less, such as 8 wt. % or less, such as 6 wt. % or less, such as 5 wt. % or less, such as 4 wt. % or less, such as 3 wt. % or less, such as 2 wt. % or less, such as 1 wt. % or less. When such additives are utilized, they may be present, alone or in combination, in such layer in an amount of 0.001 wt. % or more, such as 0.01 wt. % or more, such as 0.1 wt. % or more, such as 0.2 wt. % or more, such as 0.4 wt. % or more, such as 0.5 wt. % or more, such as 1 wt. % or more, such as 1.5 wt. % or more, such as 2 wt. % or more, such as 2.5 wt. % or more, such as 3 wt. % or more, such as 5 wt. % or more, such as 8 wt. % or more, such as 10 wt. % or more.

With the sound damping polymer on the first encasing layer, a gypsum slurry may then be provided to form a gypsum core. In this regard, the method may comprise a step of depositing a gypsum slurry onto the first encasing layer, in particular the sound damping layer formed from the sound damping polymer on the first encasing layer. In general, the composition of the gypsum core is not necessarily limited and may be any gypsum core generally known in the art. Generally, in one embodiment, the gypsum core is made from a gypsum slurry including at least stucco and water. In this regard, the method may also include a step of combining stucco, water, and any other optional additives as mentioned herein.

In general, stucco may be referred to as calcined gypsum or calcium sulfate hemihydrate. The calcined gypsum may be from a natural source or a synthetic source and is thus not necessarily limited by the present invention. In addition to the stucco, the gypsum slurry may also contain some calcium sulfate dihydrate or calcium sulfate anhydrite. If calcium sulfate dihydrate is present, the hemihydrate is present in an amount of at least 50 wt. %, such as at least 60 wt. %, such as at least 70 wt. %, such as at least 80 wt. %, such as at least 85 wt. %, such as at least 90 wt. %, such as at least 95 wt. %, such as at least 98 wt. %, such as at least 99 wt. % based on the weight of the calcium sulfate hemihydrate and the calcium sulfate dihydrate. Furthermore, the calcined gypsum may be α-hemihydrate, β-hemihydrate, or a mixture thereof.

In addition to the stucco, the gypsum slurry may also contain other hydraulic materials. These hydraulic materials may include calcium sulfate anhydrite, land plaster, cement, fly ash, or any combinations thereof. When present, they may be utilized in an amount of 30 wt. % or less, such as 25 wt. % or less, such as 20 wt. % or less, such as 15 wt. % or less, such as 10 wt. % or less, such as 8 wt. % or less, such as 5 wt. % or less based on the total content of the hydraulic material.

As indicated above, the gypsum slurry may also include water. Water may be employed for fluidity and also for rehydration of the gypsum to allow for setting. The amount of water utilized is not necessarily limited by the present invention.

In addition, the weight ratio of the water to the stucco may be 0.2 or more, such as 0.2 or more, such as 0.3 or more, such as 0.4 or more, such as 0.5 or more. The water to stucco weight ratio may be 4 or less, such as 3.5 or less, such as 3 or less, such as 2.5 or less, such as 2 or less, such as 1.7 or less, such as 1.5 or less, such as 1.4 or less, such as 1.3 or less, such as 1.2 or less, such as 1.1 or less, such as 1 or less, such as 0.9 or less, such as 0.85 or less, such as 0.8 or less, such as 0.75 or less, such as 0.7 or less, such as 0.6 or less, such as 0.5 or less, such as 0.4 or less, such as 0.35 or less, such as 0.3 or less, such as 0.25 or less, such as 0.2 or less.

In one embodiment, the gypsum core may also include a sound damping polymer as mentioned above. For instance, the sound damping polymer may be provided by mixing the sound damping polymer directly with the stucco and water to form the gypsum slurry. In addition to the sound damping polymer, if providing the sound damping polymer as a formulation or composition, other additives as mentioned above may also be utilized.

When present, the sound damping polymer may be present in the gypsum core in an amount to provide a desired sound damping effect. When making the board, the sound damping polymer may be present in an amount of 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more based on the weight of the stucco. The sound damping polymer may be present in an amount of 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco. In addition, the aforementioned weight percentages may also apply based on the weight of the gypsum in the gypsum board. In addition, the aforementioned weight percentages may also apply based on the weight of the gypsum board.

In addition to the stucco and the water, the gypsum slurry may also include any other conventional additives as known in the art. In this regard, such additives are not necessarily limited by the present invention. For instance, the additives may include dispersants, foam or foaming agents including aqueous foam (e.g. sulfates), set accelerators (e.g., BMA, land plaster, sulfate salts, etc.), set retarders, binders, biocides (such as bactericides and/or fungicides), adhesives, pH adjusters, thickeners (e.g., silica fume, Portland cement, fly ash, clay, celluloses, high molecular weight polymers, etc.), leveling agents, non-leveling agents, starches (such as pregelatinized starch, non-pregelatinized starch, and/or an acid modified starch), colorants, fire retardants or additives (e.g., silica, silicates, expandable materials such as vermiculite, perlite, etc.), water repellants, fillers and fibers (e.g., glass fibers), waxes, secondary phosphates (e.g., condensed phosphates or orthophosphates including trimetaphosphates, polyphosphates, and/or cyclophosphates, etc.), mixtures thereof, natural and synthetic polymers, etc. In general, it should be understood that the types and amounts of such additives are not necessarily limited by the present invention.

In general, each additive may be present in the gypsum slurry in an amount of 0.0001 wt. % or more, such as 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more, such as 1 wt. % or more, such as 2 wt. % or more based on the weight of the stucco. The additive may be present in an amount of 20 wt. % or less, such as 15 wt. % or less, 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco.

The manner in which the components for the gypsum slurry are combined is not necessarily limited. For instance, the gypsum slurry can be made using any method or device generally known in the art. In particular, the components of the slurry can be mixed or combined using any method or device generally known in the art. For instance, the components of the gypsum slurry may be combined in any type of device, such as a mixer and in particular a pin mixer. In this regard, the manner in which the sound damping polymer is incorporated into the gypsum slurry is not necessarily limited by the present invention. When a sound damping polymer is provided in the gypsum slurry as well, it may be provided prior to a mixing device, directly into a mixing device, and/or even after the mixing device. For instance, the sound damping polymer may be provided prior to a mixing device. In another embodiment, the sound damping polymer may be provided directly into a mixing device. Alternatively, the sound damping polymer may be provided after the mixing device (such as to the canister or boot, using a secondary mixer, or applied directly onto the slurry after a mixing device) and may be added directly or as part of a mixture. Whether provided prior to, into, or after the mixing device, the sound damping polymer may be combined directly with another component of the gypsum slurry. In addition, whether providing the sound damping polymer prior to or after the mixing device or directly into the mixing device, the compound may be delivered as a solid, as a dispersion/solution, or a combination thereof.

When provided in the gypsum core, the sound damping polymer may be provided with a carrier material. For instance, the carrier material may be a material to assist in the delivery of the sound damping polymer. The carrier material may be a liquid, a solid, or a mixture thereof. In one embodiment, the carrier material comprises a solid. In another embodiment, the carrier material comprises at least a liquid. In particular, the sound damping polymer may be delivered or provided as solution, an emulsion or a dispersion.

The carrier material may include any of the additives as mentioned above and considered herein. For instance, the carrier material may be a plasticizer (e.g., glycerin and/or it's ethoxylated derivatives, dicarboxylic/tricarboxylic ester-based plasticizers such as phthalates, trimellitates, adipates, sebacates, maleates, azelates, benzoates, terephthalates, sulfonamides, organophosphates, glycols and polyethers, etc., and mixtures thereof), a soap or foaming agent (e.g., sulfates such as ammonium ether sulfates and alkyl ether sulfates including laureth sulfates, laureth ether sulfates, and lauryl sulfates; sulfonates; sulfosuccinates; sulfolaurates; alcohol ethoxylates; amine oxides; betaines; etc. and mixtures thereof), a dispersant, a starch, a polymer (e.g., a thermoplastic polymer such as polystyrene), filler materials (e.g., perlite, vermiculite, clay such as expanded clay, hollow microspheres, etc.).

As indicated above, the carrier may include a plasticizer, a foaming agent, and/or a dispersant. In this regard, the carrier may be anionic, nonionic, or amphoteric or the carrier may include mixtures thereof. In one embodiment, the carrier may include at least an anionic. In another embodiment, the carrier may include at least a nonionic. In a further embodiment, the carrier may include at least an amphoteric.

Also, the carrier may be a starch. The starch may be a migrating starch such that it migrates. Because of such migration, the starch may assist with moving the sound damping polymer within the gypsum core. For instance, the starch may assist with moving the sound damping polymer towards the interface between the gypsum core and the encasing material. Alternatively, the starch may be a non-migrating starch. In addition, the starch may be any as known in the art. The starch may be an unmodified starch or a modified starch. For instance, the starch may be a pearl starch, a pregelatinized starch, an acid-modified starch, an extruded starch, etc. The starch may be modified such that it is ethoxylated, ethylated, or acetylated. In addition, the starch may be a corn starch, a wheat starch, a milo starch, or other commercially available starch. Furthermore, the starch may include a combination of starches (e.g., migrating and non-migrating) in order to control the dispersibility of the sound damping polymer.

In addition, the hollow microspheres may include ceramic, glass, polymeric, etc. In one example, the hollow microsphere may be a cenosphere. For instance, the microsphere may have a certain shell such as one made of alumina, silica, or iron. In addition, the microspheres may include a plurality of microspheres such as a combination of those having a shell made of alumina, silica, or iron. In addition, the microspheres may be filled with a gas (e.g., carbon dioxide, nitrogen and/or other inert gas, air, or a mixture thereof.).

The amount of carrier material employed is not necessarily limited. For instance, the carrier may be present in an amount of about 0.001 wt. % or more, such as 0.01 wt. % or more, such as 0.1 wt. % or more, such as 0.5 wt. % or more, such as 1 wt. % or more, such as 2 wt. % or more, such as 3 wt. % or more, such as wt. % or more, such as 10 wt. % or more, such as 15 wt. % or more, such as 20 wt. % or more, such as 25 wt. % or more, such as 30 wt. % or more, such as 50 wt. % or more such as 75 wt. % or more, such as 100 wt. % or more based on the weight of the sound damping polymer. The carrier may be present in an amount of 500 wt. % or less, such as 400 wt. % or less, such as 300 wt. % or less, such as 200 wt. % or less, such as 100 wt. % or less, such as 90 wt. % or less, such as 80 wt. % or less, such as 70 wt. % or less, such as 50 wt. % or less, such as 40 wt. % or less, such as 35 wt. % or less, such as 25 wt. % or less based on the weight of the sound damping polymer.

In one embodiment, the gypsum core may include a first gypsum layer and a second gypsum layer. The first gypsum layer may be between the first encasing layer (i.e., front of the board), in particular the sound damping layer on the first encasing layer, and the second gypsum layer. In addition, the first gypsum layer may have a density greater than the second gypsum layer. Accordingly, the first gypsum layer may be formed without the use of a foaming agent or with a reduced amount of foaming agent, which may be utilized in forming the second gypsum layer. In this regard, in one embodiment, the first gypsum layer may have the same composition as the second gypsum layer except that the second gypsum layer may be formed using a foaming agent.

In one embodiment, the gypsum core may also include a third gypsum layer. The third gypsum layer may be provided between the second gypsum layer and a second encasing layer. Like the first gypsum layer, the third gypsum layer may also be a dense gypsum layer. In particular, the third gypsum layer may have a density greater than the second gypsum layer. Accordingly, the third gypsum layer may be formed without the use of a foaming agent or with a reduced amount of foaming agent, which may be utilized in forming the second gypsum layer. In this regard, in one embodiment, the third gypsum layer may have the same composition as the second gypsum layer except that the second gypsum layer may be formed using a foaming agent.

Furthermore, when utilized within the gypsum core, the sound damping polymer may be provided in any of the first gypsum layer, the second gypsum layer, and/or the third gypsum layer. Alternatively, in one embodiment, the sound damping polymer may be provided in only one of such layers. In another embodiment, the sound damping polymer may be provided in two of such layers. In a further embodiment, the sound damping polymer may be provided in all three of the gypsum layers.

In this regard, when the gypsum core includes multiple gypsum layers, the gypsum slurry may be deposited in multiple steps for forming the gypsum core. For instance, each gypsum layer may require a separate deposition of gypsum slurry. In this regard, with a first gypsum layer and a second gypsum layer, a first gypsum slurry may be deposited followed by a second gypsum slurry. The first gypsum slurry and the second gypsum slurry may have the same composition except that the second gypsum slurry may include a foaming agent or more foaming agent than the first gypsum slurry. In this regard, in one embodiment, the first gypsum slurry may not include a foaming agent. Accordingly, the first gypsum slurry may result in a dense gypsum layer, in particular a non-foamed gypsum layer. Such gypsum layer may have a density greater than the gypsum layer formed from the second gypsum slurry, or foamed gypsum layer.

Similarly, when the gypsum core includes three gypsum layers, the gypsum slurry may be deposited in three steps for forming the gypsum core. For example, a first and second gypsum slurry may be deposited as indicated above and a third gypsum slurry may be deposited onto the second gypsum slurry. The third gypsum slurry and the second gypsum slurry may have the same composition except that the second gypsum slurry may include a foaming agent or more foaming agent than the third gypsum slurry. In this regard, in one embodiment, the third gypsum slurry may not include a foaming agent. Accordingly, the third gypsum slurry may result in a dense gypsum layer, in particular a non-foamed gypsum layer. Such gypsum layer may have a density greater than the gypsum layer formed from the second gypsum slurry, or foamed gypsum layer.

The first gypsum layer may have a thickness that is 0.5% or more, such as 1% or more, such as 2% or more, such as 3% or more, such as 4% or more, such as 5% or more, such as 10% or more, such as 15% or more the thickness of the second (or foamed) gypsum layer. The thickness may be 80% or less, such as 60% or less, such as 50% or less, such as 40% or less, such as 30% or less, such as 25% or less, such as 20% or less, such as 15% or less, such as 10% or less, such as 8% or less, such as 5% or less the thickness of the second (or foamed) gypsum layer. In one embodiment, such relationship may also be between the third gypsum layer and the second gypsum layer.

The density of the second (or foamed) gypsum layer may be 0.5% or more, such as 1% or more, such as 2% or more, such as 3% or more, such as 4% or more, such as 5% or more, such as 10% or more, such as 15% or more the density of the first (or non-foamed) gypsum layer. The density of the second (or foamed) gypsum layer may be 80% or less, such as 60% or less, such as 50% or less, such as 40% or less, such as 30% or less, such as 25% or less, such as 20% or less, such as 15% or less, such as 10% or less, such as 8% or less, such as 5% or less the density of the first (or non-foamed) gypsum layer. In one embodiment, such relationship may also be between the third gypsum layer and the second gypsum layer. In addition, in one embodiment, all of the gypsum layers may have a different density.

In one embodiment, during the method of making the gypsum board, a sound damping polymer may be provided on the gypsum core. The sound damping polymer may be as described herein. In this regard, the sound damping polymer may be present between the gypsum core and a second encasing layer. When the gypsum core includes a first gypsum layer and a second gypsum layer, the sound damping polymer and layer may be between the second gypsum layer and the second encasing layer. When the gypsum core includes a first gypsum layer, a second gypsum layer, and a third gypsum layer, the sound damping polymer and layer may be between the third gypsum layer and the second encasing layer.

In addition, a second encasing layer may be provided on the sound damping polymer or layer. However, like with the first encasing layer and the sound damping polymer, it should be understood that the sound damping polymer may be provided offline or online. For instance, the sound damping polymer may be provided on the second encasing layer surface offline such that it is already provided on the second encasing layer prior to use in the manufacture of the gypsum board. In this regard, when providing the second encasing layer on the gypsum slurry, the sound damping polymer and layer will also automatically be provided between the gypsum layer and the second encasing layer. Alternatively, or in addition, the sound damping polymer may be provided inline during the manufacture of the gypsum board.

The encasing layer may be any encasing layer as generally employed in the art. For instance, the encasing layer may be a paper encasing layer, a fibrous (e.g., glass fiber) mat encasing layer, or a polymeric encasing layer. In general, the first encasing layer and the second encasing layer may be the same type of material. Alternatively, the first encasing layer may be one type of material while the second encasing layer may be a different type of material.

In one embodiment, the encasing layer may include a paper encasing layer. For instance, both the first and second encasing layers may be a paper encasing layer. Alternatively, in another embodiment, the encasing layer may be a glass mat encasing layer. For instance, both the first and second encasing layers may be a glass mat encasing layer. In a further embodiment, the encasing layer may be a polymeric encasing layer. For instance, both the first and second encasing layers may be a polymeric encasing layer. In another further embodiment, the encasing layer may be a metal encasing layer (e.g., an aluminum encasing layer). For instance, both the first and second encasing layers may be a metal encasing layer (e.g., an aluminum encasing layer).

After deposition of the stucco (calcined gypsum) slurry, the calcium sulfate hemihydrate reacts with the water to convert the calcium sulfate hemihydrate into a matrix of calcium sulfate dihydrate. Such reaction may allow for the stucco to set and become firm thereby allowing for the boards to be cut at the desired length. In this regard, the method may comprise a step of reacting calcium sulfate hemihydrate with water to form calcium sulfate dihydrate or allowing the calcium sulfate hemihydrate to convert to calcium sulfate dihydrate. In this regard, the method may allow for the slurry to set to form a gypsum board.

The method may also comprise a step of cutting a continuous gypsum sheet into a gypsum board. Then, after the cutting step, the method may comprise a step of supplying the gypsum board to a heating or drying device. For instance, such a heating or drying device may be a kiln and may allow for removal of any free water. The temperature and time required for heating in such heating or drying device are not necessarily limited by the present invention.

The present invention also discloses a gypsum board. The gypsum board includes a gypsum core having a first gypsum layer surface and a second gypsum layer surface opposing the first gypsum layer surface. A first sound damping layer may be disposed at a gypsum layer surface. In particular, a first sound damping layer may be disposed at a first gypsum layer surface. In one embodiment, the first sound damping layer may be disposed directly onto the first gypsum layer surface. In another embodiment, the first sound damping layer may be disposed on an encasing layer disposed on the first gypsum layer surface. In a further embodiment, a second sound damping layer may be disposed on another gypsum layer surface. Such second sound damping layer may be disposed on an encasing layer disposed on the second gypsum layer surface. In this regard, the gypsum board may include a first encasing layer, a first sound damping layer, a gypsum core, a second sound damping layer, and a second encasing layer.

In addition, when disposed, the sound damping layer may partially or entirely cover the respective surface or layer on which it is disposed or positioned. In one embodiment, the sound damping layer covers the entire surface or layer. In another embodiment, the sound damping layer only partially covers the entire surface or layer. Further, the encasing layer may entirely cover the respective surface or layer on which it is disposed or positioned.

In addition, the sound damping layer may be a monolithic, homogeneous layer. Alternatively, the sound damping layer may be a heterogeneous or discontinuous layer. Also, the sound damping layer may be provided in the form of an adhesive or glue such that drying may be required in order to form the sound damping layer. For instance, the sound damping layer may be formed from a precursor solution including any polymers as mentioned herein wherein the precursor solution is dried to form the sound damping layer.

In one embodiment, the aforementioned gypsum board may be sandwiched. For instance, two of the aforementioned gypsum boards may be sandwiched or glued together to form a composite gypsum board. Such composite gypsum board may provide further improvements in properties.

The sound damping gypsum board disclosed herein may have many applications. For instance, the gypsum board may be used as a standalone board in construction for the preparation of walls, ceilings, floors, etc. In addition, the sound damping gypsum board may be installed on an existing or installed gypsum board, wall, or panel. As used in the present disclosure, the term "gypsum board," generally refers to any panel, sheet, or planar structure, either uniform or formed by connected portions or pieces, that is constructed to at least partially establish one or more physical boundaries. Such existing, installed, or otherwise established or installed wall or ceiling structures comprise materials that may include, as non-limiting examples, gypsum, stone, ceramic, cement, wood, composite, or metal materials. The installed gypsum board forms part of a building structure, such as a wall or ceiling. The installation of the sound damping gypsum board as disclosed herein can provide a desired acoustical performance to an existing or installed gypsum board that does not have any sound damping capabilities or ineffective sound damping abilities or can be used to further enhance acoustical performance.

Regardless of the application, the gypsum board as disclosed herein provides the desired sound damping properties. In particular, the gypsum board exhibits a decay time of 2 seconds or less, such as 1.8 seconds or less, such as 1.5 seconds or less, such as 1.3 seconds or less, such as 1 second or less, such as 0.9 seconds or less, such as 0.8 seconds or less, such as 0.7 seconds or less, such as 0.6 seconds or less, such as 0.5 seconds or less, such as 0.4 seconds or less, such as 0.3 seconds or less, such as 0.2 seconds or less, such as 0.1 seconds or less, such as 0.01 seconds or less, such as 0.001 seconds or less. The decay time may be 0.0001 seconds or more, such as 0.001 seconds or more, such as 0.01 seconds or more, such as 0.01 seconds or more, such as 0.1 seconds or more, such as 0.2 seconds or more, such as 0.3 seconds or more, such as 0.4 seconds or more, such as 0.5 seconds or more, such as 0.6 seconds or more, such as 0.7 seconds or more. In general, the lower the decay time, the better the performance of the gypsum board and sound damping properties. In one embodiment, the decay time may be reduced by at least 10%, such as at least 20%, such as at least 30%, such as at least 40%, such as at least 50%, such as at least 60%, such as at least 70%, such as at least 80%, such as at least 90%, such as at least 95% in comparison to a control board. For example, such control board may be the same board as the inventive gypsum board except without the use of the sound damping polymer.

The thickness of the gypsum board, and in particular, the gypsum core, is not necessarily limited and may be from about 0.25 inches to about 1 inch. For instance, the thickness may be at least ¼ inches, such as at least 5/16 inches, such as at least ⅜ inches, such as at least ½ inches, such as at least ⅝ inches, such as at least ¾ inches, such as at least 1 inch. In this regard, the thickness may be about any one of the aforementioned values. For instance, the thickness may be about ¼ inches. Alternatively, the thickness may be about ⅜ inches. In another embodiment, the thickness may be about ½ inches. In a further embodiment, the thickness may be about ⅝ inches. In another further embodiment, thickness may be about 1 inch. In addition, at least two gypsum boards may be combined to create another gypsum board. For example, at least two gypsum boards having a thickness of about 5/16 inches each may be combined or sandwiched to create a gypsum board having a thickness of about inches. While this is one example, it should be understood that any combination of gypsum boards may be utilized to prepare a sandwiched gypsum board. With regard to the thickness, the term "about" may be defined as within 10%, such as within 5%, such as within 4%, such as within 3%, such as within 2%, such as within 1%.

It should be understood that when a composite gypsum board containing two of the aforementioned gypsum boards is present, such composite may be about twice the aforementioned thickness.

In addition, the board weight of the gypsum board is not necessarily limited. For instance, the gypsum board may have a board weight of 500 lbs/MSF or more, such as about 600 lbs/MSF or more, such as about 700 lbs/MSF or more, such as about 800 lbs/MSF or more, such as about 900 lbs/MSF or more, such as about 1000 lbs/MSF or more, such as about 1100 lbs/MSF or more, such as about 1200 lbs/MSF or more, such as about 1300 lbs/MSF or more, such as about 1400 lbs/MSF or more, such as about 1500 lbs/MSF or more. The board weight may be about 7000 lbs/MSF or less, such as about 6000 lbs/MSF or less, such as about 5000 lbs/MSF or less, such as about 4000 lbs/MSF or less, such as about 3000 lbs/MSF or less, such as about 2500 lbs/MSF or less, such as about 2000 lbs/MSF or less, such as about 1800 lbs/MSF or less, such as about 1600 lbs/MSF or less, such as about 1500 lbs/MSF or less, such as about 1400 lbs/MSF or less, such as about 1300 lbs/MSF or less, such as about 1200 lbs/MSF or less. Such board weight may be a dry board weight such as after the board leaves the heating or drying device (e.g., kiln).

In addition, the gypsum board may have a density of about 5 pcf or more, such as about 10 pcf or more, such as about 15 pcf or more, such as about 20 pcf or more. The board may have a density of about 60 pcf or less, such as about 50 pcf or less, such as about 40 pcf or less, such as about 35 pcf or less, such as about 33 pcf or less, such as about 30 pcf or less, such as about 28 pcf or less, such as about 25 pcf or less, such as about 23 pcf or less, such as about 20 pcf or less.

The gypsum board may have a certain nail pull resistance, which generally is a measure of the force required to pull a gypsum panel off of a wall by forcing a fastening nail through the panel. The values obtained from the nail pull test generally indicate the maximum stress achieved while the fastener head penetrates through the board surface and core. In this regard, the gypsum board exhibits a nail pull resistance of at least about 25 $lb_f$, such as at least about 30 pounds, such as at least about 35 $lb_f$, such as at least about 40 lb$_f$, such as at least about 45 lb$_f$, such as at least about 50 lb$_f$, such as at least about 55 lb$_f$, such as at least about 60 lb$_f$, such as at least about 65 lb$_f$, such as at least about 70 lb$_f$, such as at least about 75 lb$_f$, such as at least about 77 lb$_f$, such as at least about 80 lb$_f$, such as at least about 85 lb$_f$, such as at least about 90 lb$_f$, such as at least about 95 lb$_f$, such as at least about 100 lb$_f$ as tested according to ASTM C1396. The nail pull resistance may be about 150 lb$_f$ or less, such as about 140 lb$_f$ or less, such as about 130 lb$_f$ or less, such as about 120 lb$_f$ or less, such as about 110 lb$_f$ or less, such as about 105 lb$_f$ or less, such as about 100 lb$_f$ or less, such as about 95 lb$_f$ or less, such as about 90 lb$_f$ or less, such as about 85 lb$_f$ or less, such as about 80 lb$_f$ or less as tested according to ASTM C1396. Such nail pull resistance may be based upon the thickness of the gypsum board. For instance, when conducting a test, such nail pull resistance values may vary depending on the thickness of the gypsum board. As an example, the nail pull resistance values above may be for a ⅝ inch board. However, it should be understood that instead of a ⅝ inch board, such nail pull resistance values may be for any other thickness gypsum board as mentioned herein.

The gypsum board may have a certain compressive strength. For instance, the compressive strength may be about 150 psi or more, such as about 200 psi or more, such as about 250 psi or more, such as about 300 psi or more, such as about 350 psi or more, such as about 375 psi or more, such as about 400 psi or more, such as about 500 psi or more as tested according to ASTM C473. The compressive strength may be about 3000 psi or less, such as about 2500 psi or less, such as about 2000 psi or less, such as about 1700 psi or less, such as about 1500 psi or less, such as about 1300 psi or less, such as about 1100 psi or less, such as about 1000 psi or less, such as about 900 psi or less, such as about 800 psi or less, such as about 700 psi or less, such as about 600 psi or less, such as about 500 psi or less. Such compressive strength may be based upon the density and thickness of the gypsum board. For instance, when conducting a test, such compressive strength values may vary depending on the thickness of the gypsum board. As an example, the compressive strength values above may be for a ⅝ inch board. However, it should be understood that instead of a ⅝ inch board, such compressive strength values may be for any other thickness gypsum board as mentioned herein.

In addition, the gypsum board may have a core hardness of at least about 8 lb$_f$, such as at least about 10 lb$_f$, such as at least about 11 lb$_f$, such as at least about 12 lb$_f$, such as at least about 15 lb$_f$, such as at least about 18 lb$_f$, such as at least about 20 lb$_f$ as tested according to ASTM C1396. The gypsum board may have a core hardness of 50 lb$_f$ or less, such as about 40 lb$_f$ or less, such as about 35 lb$_f$ or less, such as about 30 lb$_f$ or less, such as about 25 lb$_f$ or less, such as about 20 lb$_f$ or less, such as about 18 lb$_f$ or less, such as about 15 lb$_f$ or less as tested according to ASTM C1396. In addition, the gypsum board may have an end hardness according to the aforementioned values. Further, the gypsum board may have an edge hardness according to the aforementioned values. Such core hardness may be based upon the thickness of the gypsum board. For instance, when conducting a test, such core hardness values may vary depending on the thickness of the gypsum board. As an example, the core hardness values above may be for a ⅝ inch board. However, it should be understood that instead of a ⅝ inch board, such core hardness values may be for any other thickness gypsum board as mentioned herein.

EXAMPLES

Example 1

This example demonstrates use of the sound damping polymer between an encasing layer and the gypsum core by providing the polymer at the interface of an encasing layer and the gypsum slurry. When utilized, 30 grams of the sound damping polymer were provided to form the sound damping layer.

Samples were tested for decay time using SigView software made by SignalLab. Nominal 12" by 12" samples were suspended on a wire and impacted on one side with consistent force using a hammer with an accelerometer affixed to the opposite side from the point of impact. The decay time was determined through the software interface by denoting the period between the initial time of impact with the sample and the time when the amplitude of the sound signal approached zero. The average of three tests was used to report sample decay time.

| Sample | Thickness (inches) | Weight (lbs/MSF) | Decay Time (seconds) |
|---|---|---|---|
| ½" Series | | | |
| Control board without any sound damping polymer | 0.50 | 2470 | 1.51 |
| Sound damping polymer applied to interior of encasing layer (no additives mixed with polymer) | 0.50 | 2470 | 0.67 |
| Sound damping polymer applied to interior of encasing layer - (land plaster blended with polymer) | 0.50 | 2490 | 0.72 |
| Sound damping polymer applied to interior of encasing layer - (cellulose fibers blended with polymer) | 0.50 | 2490 | 0.78 |
| Sound damping polymer on exterior of encasing layer with additional encasing layer over polymer | 0.50 | 2580 | 0.89 |
| ⅝" Inch Series | | | |
| Control board including two ¼" panels sandwiched and glued with sound damping polymer | 0.625 | 2590 | 0.31 |
| Control board without any sound damping polymer | 0.625 | 2890 | 0.87 |

-continued

| Sample | Thickness (inches) | Weight (lbs/MSF) | Decay Time (seconds) |
|---|---|---|---|
| Sound damping polymer on exterior of encasing layer with additional encasing layer over polymer | 0.625 | 2980 | 0.62 |
| Board with sound damping polymer applied to interior of encasing layer | 0.625 | 2730 | 0.47 |
| Sandwich Series | | | |
| Control board using two ½" boards with no sound damping polymer | 1.00 | 4940 | 0.34 |
| Board with no sound damping polymer in the core + Board with sound damping polymer between encasing layer and a second exterior encasing layer | 1.00 | 5050 | 0.38 |
| Board with no sound damping polymer in the core + Board with sound damping polymer applied to interior of encasing layer | 1.00 | 4940 | 0.24 |
| Control board using two ½" boards with sound damping polymer between the boards | 1.00 | 4970 | 0.23 |

Example 2

This example demonstrates use of the sound damping polymer between an encasing layer and the gypsum core by providing the polymer at the interface of an encasing layer and the gypsum slurry. The thickness of the boards was ⅝ inches. When utilized, 30 grams of the sound damping polymer were provided to form the sound damping layer.

Samples were tested for decay time using SigView software made by SignalLab. Nominal 12" by 12" samples were suspended on a wire and impacted on one side with consistent force using a hammer with an accelerometer affixed to the opposite side from the point of impact. The decay time was determined through the software interface by denoting the period between the initial time of impact with the sample and the time when the amplitude of the sound signal approached zero. The average of three tests was used to report sample decay time.

| Sample | Weight (lbs/MSF) | Decay Time (seconds) |
|---|---|---|
| Control conventional sound damping gypsum board comprising a monolithic damping layer glued between two 5/16" panels | 2707 | 0.213 |
| Control gypsum board | 3040 | 0.730 |
| Sound damping polymer applied to interior of paper encasing layer | 3024 | 0.310 |
| Sound damping polymer applied to interior of paper encasing layer in grid pattern | 3012 | 0.421 |
| Sound damping polymer applied to interior of glass mat encasing layer | 3110 | 0.506 |
| Sound damping polymer applied to interior of glass mat encasing layer | 3040 | 1.445 |

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

The invention claimed is:

1. A method of forming a gypsum board, the method comprising:
   providing a first encasing layer,
   depositing a gypsum slurry comprising stucco and water on the first encasing layer to form a gypsum core,
   providing a second encasing layer having a first sound damping layer thereon on the gypsum slurry, wherein the first sound damping layer is between the gypsum slurry and the second encasing layer and wherein the first sound damping layer includes at least 50 wt. % of a first sound damping polymer, and
   allowing the stucco to convert to calcium sulfate dihydrate.

2. The method of claim 1, further comprising providing a second sound damping layer on the first encasing layer wherein the second sound damping layer includes a second sound damping polymer.

3. The method of claim 2, wherein the second sound damping layer is directly between and contacts the first encasing layer and the gypsum slurry.

4. The method of claim 1, wherein the first sound damping layer is directly between and contacts the second encasing layer and the gypsum slurry.

5. The method of claim 1, wherein the gypsum slurry comprises a first gypsum slurry for providing a first gypsum layer of the gypsum core and a second gypsum layer for providing a second gypsum layer of the gypsum core, wherein the first gypsum layer has a density greater than the second gypsum layer.

6. The method of claim 1, wherein the first sound damping polymer comprises a viscoelastic polymer.

7. The method of claim 1, wherein the first sound damping layer includes rubber, cork, or a mixture thereof.

8. The method of claim 1, wherein the first sound damping layer includes a cellulosic material, glycerin, or a mixture thereof.

9. The method of claim 1, wherein the first sound damping layer includes an additive also included in the gypsum slurry.

10. The method of claim 1, wherein the first sound damping polymer comprises an acrylic polymer or copolymer.

11. The method of claim 1, wherein the first sound damping layer includes at least 90 wt. % of the first sound damping polymer.

12. The method of claim 1, wherein the first sound damping polymer is present in an amount of from 0.001 lbs/MSF to 150 lbs/MSF based on the weight of the gypsum board.

13. The method of claim 1, wherein the gypsum slurry further includes a third sound damping polymer.

14. The method of claim 1, wherein the first sound damping layer comprises gypsum.

15. The method of claim 1, wherein the first sound damping layer comprises a pigment.

16. The method of claim 1, wherein the first sound damping layer comprises calcium carbonate, magnesium carbonate, or a mixture thereof.

17. The method of claim 1, wherein the first sound damping layer comprises an inorganic particle.

18. The method of claim 1, wherein the gypsum board exhibits a sound transmission loss of 20% or more in comparison to a board without the first sound damping layer.

19. The method of claim 1, wherein the first sound damping polymer is provided in a formulation having a viscosity of from 500 cps to 15000 cps.

* * * * *